(12) United States Patent
Snitchler et al.

(10) Patent No.: US 6,509,819 B2
(45) Date of Patent: *Jan. 21, 2003

(54) ROTOR ASSEMBLY INCLUDING SUPERCONDUCTING MAGNETIC COIL

(75) Inventors: Gregory L. Snitchler, Shrewsbury, MA (US); Bruce B. Gamble, Wellesley, MA (US); John P. Voccio, Somerville, MA (US)

(73) Assignee: American Superconductor Corporation, Westborough, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/359,497

(22) Filed: Jul. 23, 1999

(65) Prior Publication Data

US 2002/0149453 A1 Oct. 17, 2002

(51) Int. Cl.$^7$ ................................................ H01F 1/00
(52) U.S. Cl. ........................................ 335/216; 336/232
(58) Field of Search .......................... 335/216; 336/208, 336/223, 225, 231

(56) References Cited

U.S. PATENT DOCUMENTS

| | | | | |
|---|---|---|---|---|
| 1,183,616 A | * | 5/1916 | Wooldridge | 336/212 |
| 2,135,315 A | * | 11/1938 | Walters et al. | 336/212 |
| 2,846,657 A | * | 8/1958 | Horelick | 336/234 |
| 3,045,195 A | * | 7/1962 | Smith | 336/234 |
| 3,928,832 A | * | 12/1975 | Forsberg et al. | 336/70 |
| 4,336,561 A | | 6/1982 | Murphy | |
| 4,554,731 A | | 11/1985 | Borden | |
| 4,617,789 A | | 10/1986 | Borden | |
| 5,237,298 A | | 8/1993 | Boom et al. | |
| 5,310,705 A | * | 5/1994 | Mitlitsky et al. | 505/705 |

* cited by examiner

*Primary Examiner*—Lincoln Donovan
*Assistant Examiner*—Tuyen Nguyen
(74) *Attorney, Agent, or Firm*—Fish & Richardson P.C.

(57) ABSTRACT

Superconducting coils and methods of manufacture include a superconductor tape wound concentrically about and disposed along an axis of the coil to define an opening having a dimension which gradually decreases, in the direction along the axis, from a first end to a second end of the coil. Each turn of the superconductor tape has a broad surface maintained substantially parallel to the axis of the coil.

20 Claims, 5 Drawing Sheets

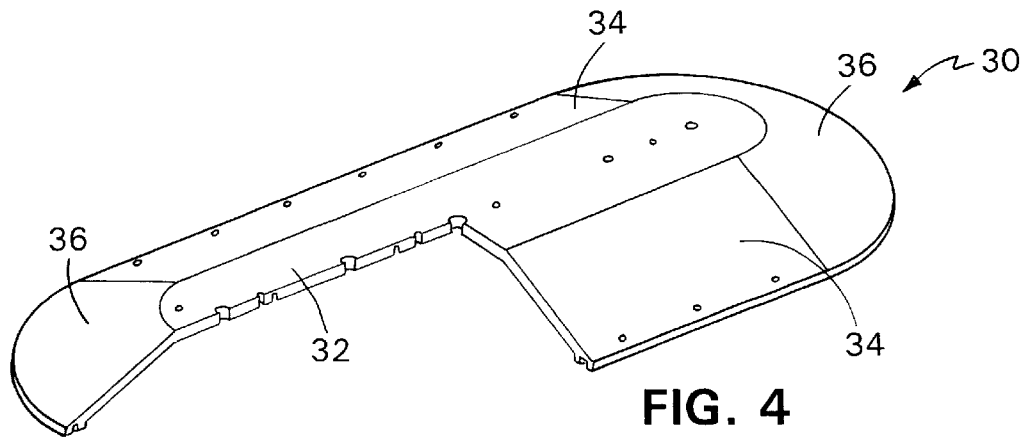
FIG. 4
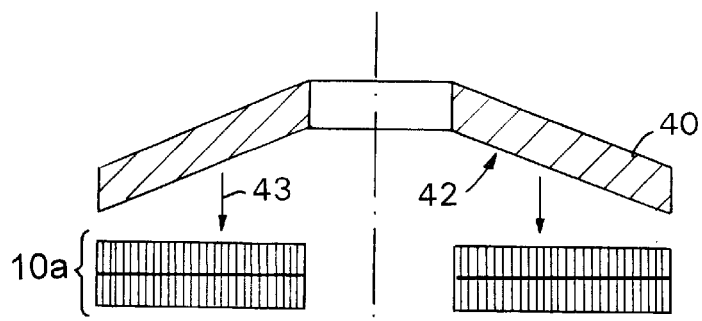
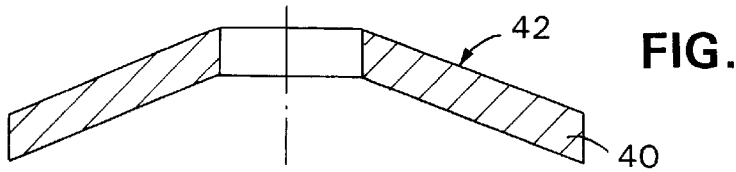
FIG. 5A
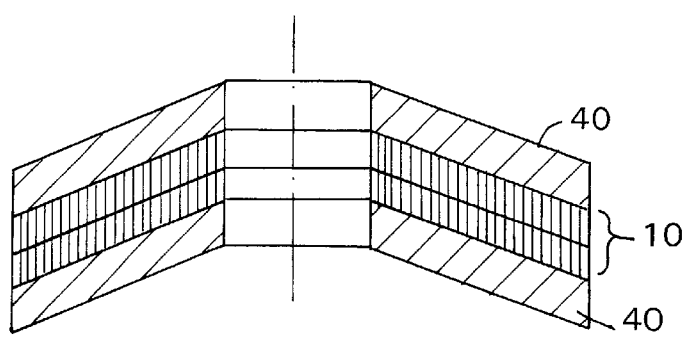
FIG. 5B

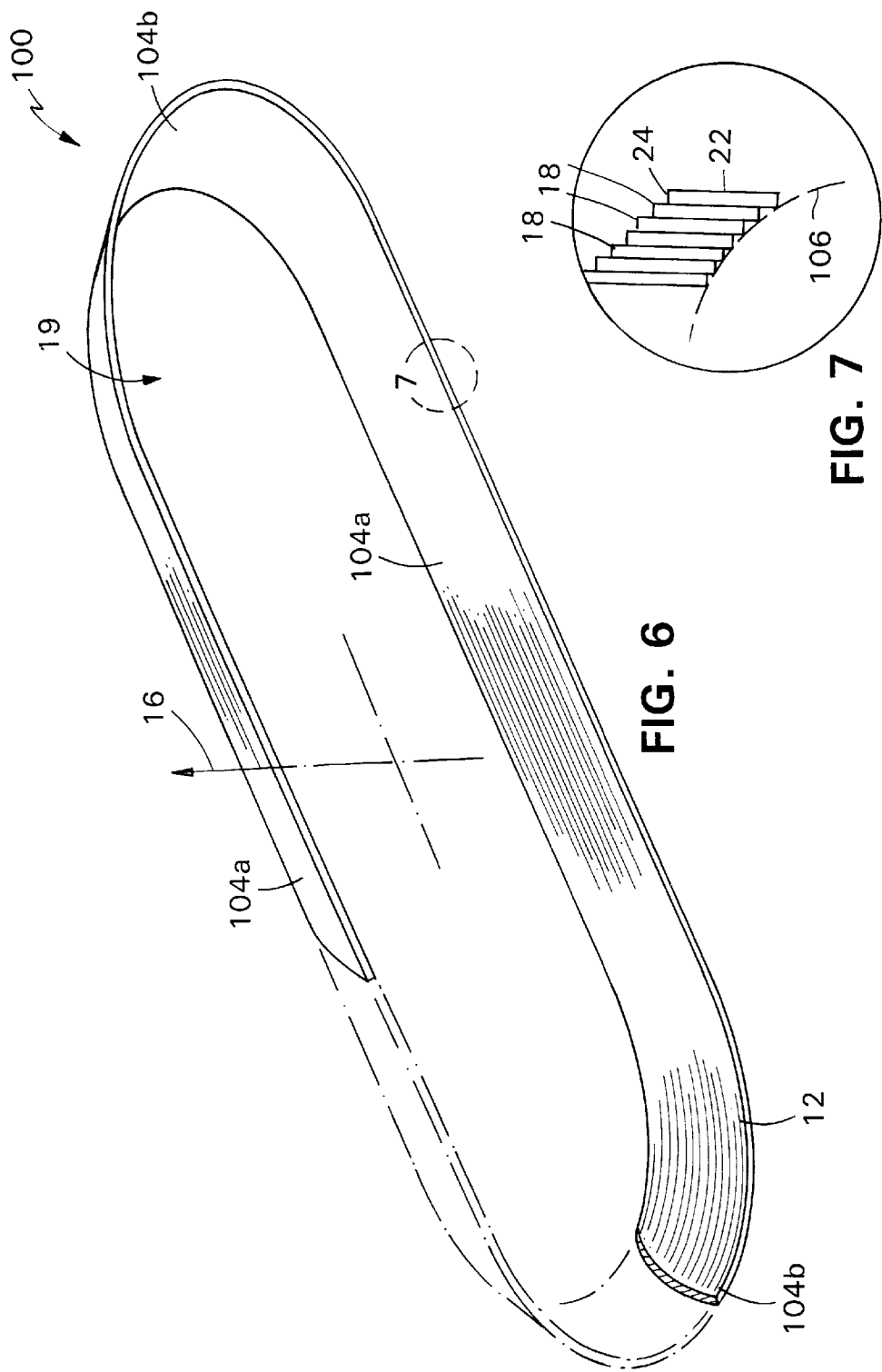

ROTOR ASSEMBLY INCLUDING SUPERCONDUCTING MAGNETIC COIL

STATEMENT AS TO FEDERALLY SPONSORED RESEARCH

This invention was made with Government support under Prime Contract No. DE-FC36-93CH10580 awarded to Reliance Electric Co. by the Department of Energy. The Government has certain rights under this invention.

BACKGROUND OF THE INVENTION

The invention relates to superconducting magnetic coils.

Superconductors may be used to fabricate superconducting magnetic coils such as solenoids, multipole magnets, etc., in which the superconductor is wound into the shape of a coil. When the temperature of the coil is sufficiently low that the superconductor can exist in a superconducting state, the current carrying capacity as well as the magnitude of the magnetic field generated by the coil is significantly increased.

Typical superconducting materials include niobium-titanium, niobium-tin, and also copper oxide ceramics such as members of the rare-earth-copper-oxide family (i.e., YBCO), the thallium-barium-calcium-copper-oxide family (i.e., TBCCO), the mercury-barium-calcium-copper-oxide family (i.e., HgBCCO), and the bismuth-strontium-calcium-copper-oxide family (with or without lead substitutes, i.e., $(Bi,Pb)_2Sr_2Ca_2Cu_3O_{10}$, $Bi_2Sr_2Ca_2Cu_3O_{10}$ (BSCCO (2223)), which perform particularly well because their superconductivity and corresponding high current density characteristics are achieved at relatively high temperatures ($T_c \approx 108°$ K.)

In fabricating certain superconducting magnetic coils, the superconductor may be formed in the shape of a thin tape which allows the conductor to be bent around the diameter of a core. For example, high temperature superconductor (HTS) is often fabricated as a thin tape in which multi-filament composite superconductor including individual superconducting filaments extends substantially the length of the multi-filament composite conductor and are surrounded by a matrix-forming material, which is typically silver or another noble metal. Although the matrix forming material conducts electricity, it is not superconducting. Together, the superconducting filaments and the matrix-forming material form the multi-filament composite conductor. In some applications, the superconducting filaments and the matrix-forming material are encased in an insulating layer (not shown).

One approach for winding a magnetic coil with superconducting tape is known as pancake winding, in which the superconductor tape is wound one turn on top of a preceding turn thereby forming a plane of turns perpendicular to the axis of the coil. In applications where a series of pancake coils are to be used to form a coil, the pancake coils can be wound as double pancakes.

In some applications, a superconducting magnetic coil assembly using pancake coils (whether single or double) may include several coils, coaxially disposed along the length of the coil assembly. The individual coils are interconnected using short lengths of superconducting wire or ribbon made from the superconducting materials of the type described above, for example, copper oxide ceramic.

One example of this arrangement is described in U.S. Pat. No. 5,581,220, assigned to the assignee of the present invention and incorporated herein by reference, which describes a variable-profile (e.g., stair-stepped) superconducting magnetic coil with a varying radial cross section. Another example of a superconducting coil having a stacked arrangement of pancake coils is the "saddle-shaped" coil, which is oval-shaped or rectangular with rounded corners.

The variable-profile and saddle-shaped coils are advantageously used in applications where the superconducting magnetic coil is required to conform to or be positioned within an annular region of an assembly, such as a rotating electric machine.

SUMMARY OF THE INVENTION

The invention features a superconducting coil having a conical or tapered profile.

In one aspect of the invention, the superconducting coil includes a superconductor tape wound concentrically about and disposed along an axis of the coil to provide a plurality of concentric turns defining an opening having a dimension which gradually decreases, in the direction along the axis, from a first end to a second end of the coil. Each turn of the superconductor tape has a broad surface maintained substantially parallel to the axis of the coil.

The decreasing dimension opening defined by the winding configuration of the coil provides a coil having a tapered profile. The advantages of a tapered superconducting coil having this arrangement are numerous. For example, the tapered superconducting coil is well-suited for use in applications where the coil is to be positioned in annularly-shaped volumes, such as those commonly found in rotating electric machines (e.g., motors or generators.) In general, the tapered arrangement eliminates stepped profiles, common with other stacked arrangements. In particular, the tapered superconducting coil requires relatively fewer stacked individual coils to fill annularly-shaped volumes. This is in contrast to other superconducting coil assemblies, which require stacking of many more thin, individual coils to fill an annularly-shaped volume. Moreover, reducing the number of individual coils, in turn, reduces the number of electrical connections between the individual coils, thereby increasing the overall performance and reliability of a coil assembly using tapered coils.

In addition, the superconductor tape of the present invention is wound with its broad surface maintained substantially parallel to the axis of the coil (as well as to adjacent turns.) This feature is particularly advantageous when the tape is formed of less flexible, brittle materials, such as ceramic-based high temperature superconducting materials.

Furthermore, the tapered configuration provides better critical current ($I_c$) retention characteristics and allows for better coil grading.

In another aspect of the invention, a superconducting coil assembly includes a plurality of superconducting coils in a stacked arrangement, each having the characteristics described above. Because the turns of superconductor tape for each coil has its broad surface maintained substantially parallel to the axis of the coil assembly, the individual coils are easily stacked without the need for spacers or wedges. In certain embodiments of this aspect of the invention, the coils are substantially identical, which is particularly advantageous in certain applications (e.g., rotating machines) where the coil assembly is to be placed within a predefined annularly-shaped volume.

In certain stacked arrangements, a top and a bottom coil (e.g., pancakes) at each end of the stack (a first end coil and a second end coil, respectively) are preselected to have a higher critical current retention characteristic than critical current retention characteristic of the coils positioned between the top and bottom coils of the stack. Similarly, groups of coils at the top and bottom ends of the coil assembly may be preselected to have a higher critical current retention characteristic. Positioning top and bottom pancake coils with higher critical current retention characteristics in this manner can significantly lower the power loss of the total coil assembly. The top and bottom pancake coils can be preselected by their intrinsic properties or, alternatively, with small changes in the superconductor tape dimensions.

Embodiments of these aspects of the invention may also include one or more of the following features.

The superconductor tape is wound in a racetrack shape defining a pair of opposing arcuate end sections and a pair of opposing substantially straight side sections.

The superconductor tape includes a multi-filament composite superconductor including individual superconducting filaments which extend the length of the multi-filament composite conductor and are surrounded by a matrix-forming material. The superconductor tape preferably includes an anisotropic high temperature superconductor, such as $(Bi, Pb)_2Sr_2Ca_2Cu_3O$. In alternative embodiments, the superconductor tape includes a copper oxide ceramic, such as those which are members of the rare-earth-copper-oxide family (i.e., YBCO.)

In certain embodiments, the superconductor tape includes a pair of superconductor layers and at least one mechanical reinforcing layer. The pair of superconductor layers are disposed between a pair of mechanical reinforcing layers, each reinforcing layer including stainless steel.

The superconducting coil is in the form of a pancake coil, such as a double pancake coil.

In one embodiment, the superconductor tape is wound to provide a linearly tapered inner surface of the coil extending along the axis of the coil. In an alternative embodiment, the superconductor tape is wound to provide a curved inner surface of the coil extending along the axis of the coil. In this embodiment, the curved inner surface of the wound superconductor tape is cylindrically-shaped along the opposing substantially straight side sections and spherically-shaped along the opposing arcuate end sections.

In another aspect of the invention, a method of providing a superconducting coil includes the following steps. A superconductor tape is wound about an axis of the coil to provide concentric turns defining an opening having an inner dimension with a broad surface of the superconductor tape maintained substantially parallel to the axis of the coil. The tape is wound so that the opening gradually decreases from a first end to a second end in the direction along the axis.

Embodiments of this aspect of the invention includes one or more of the following features.

The superconducting coil is wound using a mandrel having surfaces which define the taper. For example, the surfaces may be linearly tapered or curved (e.g., cylindrically-shaped or spherically-shaped.) In an alternative approach, a pair of heated plates are used to apply heat and pressure to mold the superconducting coil into a tapered profile.

Other advantages and features will become apparent from the following description and the claims.

BRIEF DESCRIPTION OF THE DRAWINGS

FIG. 4 is a perspective view of a mandrel suitable for winding the superconducting coil of FIG. 1.

FIGS. 5A and 5B illustrate an alternative approach for forming the superconducting coil of FIG. 1.

FIG. 6 is a perspective view of an alternative embodiment of a superconducting coil.

FIG. 7 is an exploded view of a portion of the superconducting coil along line 7—7 of FIG. 6.

DETAILED DESCRIPTION

Figure 1:
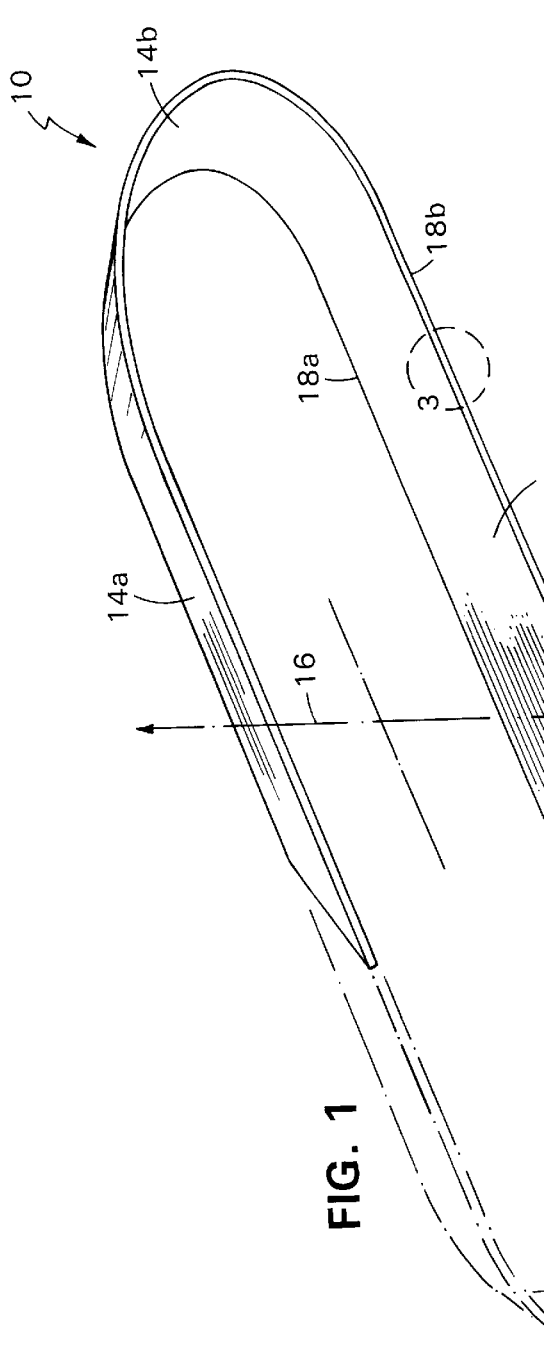
FIG. 1 is a perspective, partially cutaway view of a superconducting coil in accordance with the invention.

Referring to FIG. 1, a tapered superconducting coil 10 includes a superconductor tape 12 wound generally in an elongated oval or racetrack shape. The "racetrack-shaped" superconducting coil 10 includes a pair of opposing and generally straight side sections 14a and a pair of opposing curved end sections 14b, which together form a generally rectangularly-shaped coil with rounded corners. It is important to note that although coil 10 is "racetrack-shaped," it does not have the shape or structure of the well-known racetrack coil. As will be described below in conjunction with one fabrication approach, coil 10 is wound about an axis 16 of the coil from a continuous length or series of lengths of superconductor tape, thereby forming a number of windings or turns 18 of the coil (see FIG. 3.) The turns, in combination, define an opening 19 which, as will be described in greater detail below, increases in size from the innermost turn to the outermost turn. This approach for winding the superconductor tape is often referred to as pancake winding, in which the superconductor tape is wound one turn on top of a preceding turn thereby forming a plane of turns perpendicular to axis 16 of coil 10.

Figure 3:
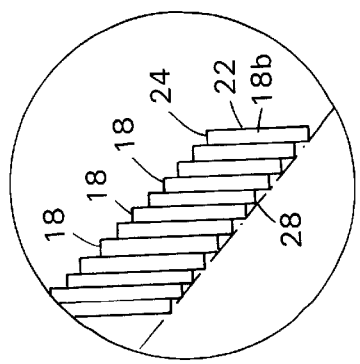
FIG. 3 is an exploded view of a portion of the superconducting coil along line 3—3 of FIG. 1.

Referring to FIG. 3, superconductor tape 12 includes broad sides 22 and narrow sides 24. In one embodiment, superconductor tape includes a multi-filament composite superconductor layer 25 having individual superconducting filaments extending substantially the length of the multi-filament composite conductor and surrounded by a matrix-forming material, such as silver. The superconducting filaments and matrix-forming material together form the multi-filament composite conductor. In many applications, the superconducting filaments and the matrix-forming material are encased in an insulating layer (not shown).

Figure 2:
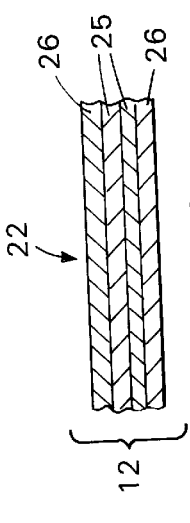
FIG. 2 is a cross-sectional side view of a portion of a superconductor tape for winding the superconducting coil of FIG. 1.

Referring to FIG. 2, in one embodiment, a pair of superconductor layers 25 are sandwiched between a pair of reinforcement members 26, for example of stainless steel, which provide mechanical support to the superconductor layers 20. One approach for fabricating a reinforced superconductor tape in this manner is described in U.S. patent application Ser. No. 08/701,375, assigned to American Superconductor Corporation, assignee of the present invention, and incorporated herein by reference.

Referring to FIG. 3, each turn 18 of superconductor tape 12 is wound such that each turn is slightly offset, in the direction of axis 16, from a preceding turn so that from the innermost turn 18a (FIG. 1) to the outermost turn 18b, coil 10 is wound in tapered fashion along an imaginary line 28. It is important to note that broad sides 22 of each turn 18 are parallel to each other and to axis 16.

Referring to FIG. 4, a mandrel 30 is formed here, for example, of aluminum and is used with a winding mechanism carrying spools of the superconductor layers and stainless reinforcing members (neither shown) to wind superconductor coil 10. Mandrel 30 includes a central mount section 32 surrounded by opposing tapering side sections 34 and opposing tapering end sections 36. Mandrel defines the shape and degree of taper for winding coil 10. A tool (not shown) follows the surface of mandrel 30 and guides superconductor tape 12 in place on the mandrel.

Referring to FIGS. 5A and 5B, an alternative approach for forming tapered superconducting coil 10 is shown. In this approach, superconducting coil 10 is formed first as a conventional pancake coil 10a, without tapered edges; that is, each turn of coil 10a lies directly and entirely over the preceding turn. Kapton® film (a product of E.I. duPont de Nemours and Company, Wilmington, Del.) having a B-staged epoxy is wrapped "in-hand" with superconductor tape 12 during the winding process of the pancake coil. The epoxy has a tacky characteristic which helps hold the adjacent turns together. Referring to FIG. 5A, pancake coil 10a is then placed between a pair of heating plates 40 having tapered surfaces 42, which define the shape and desired degree of taper for superconducting coil 10. Referring to FIG. 5B, heating plates 40 are brought together (in the direction of arrow 43, as shown in FIG. 5A) and heat and pressure are applied to pancake coil 10a, thereby forming superconducting coil 10. The heat and pressure are removed after a predetermined period of time, to allow the epoxy to cool so that the adjacent turns of superconducting coil 10 are bonded together.

Referring to FIG. 6, an alternative embodiment of a superconducting coil 100 is shown wound with the same superconductor tape 12 described above for winding coil 10. In this embodiment, however, superconductor tape 12 is wound so that regions of the tape along opposing side sections 104a are cylindrically tapered while regions of the tape along opposing end sections 104b are spherically tapered.

Referring to FIG. 7, in particular, superconductor tape 12 is wound at both side sections 104a and end sections 104b in tapered fashion along an imaginary curved line 106. Because side sections 104a are straight in the plane of the coil, tapering along these sections is based on a cylinder. At rounded end sections 104b, on the other hand, the tapering is based on a quartered section of a sphere. Note that as was the case with the linearly tapered embodiment described above, the broad sides 22 of each turn of the superconductor tape in this case are still parallel to each other and to axis 16.

Figure 8:
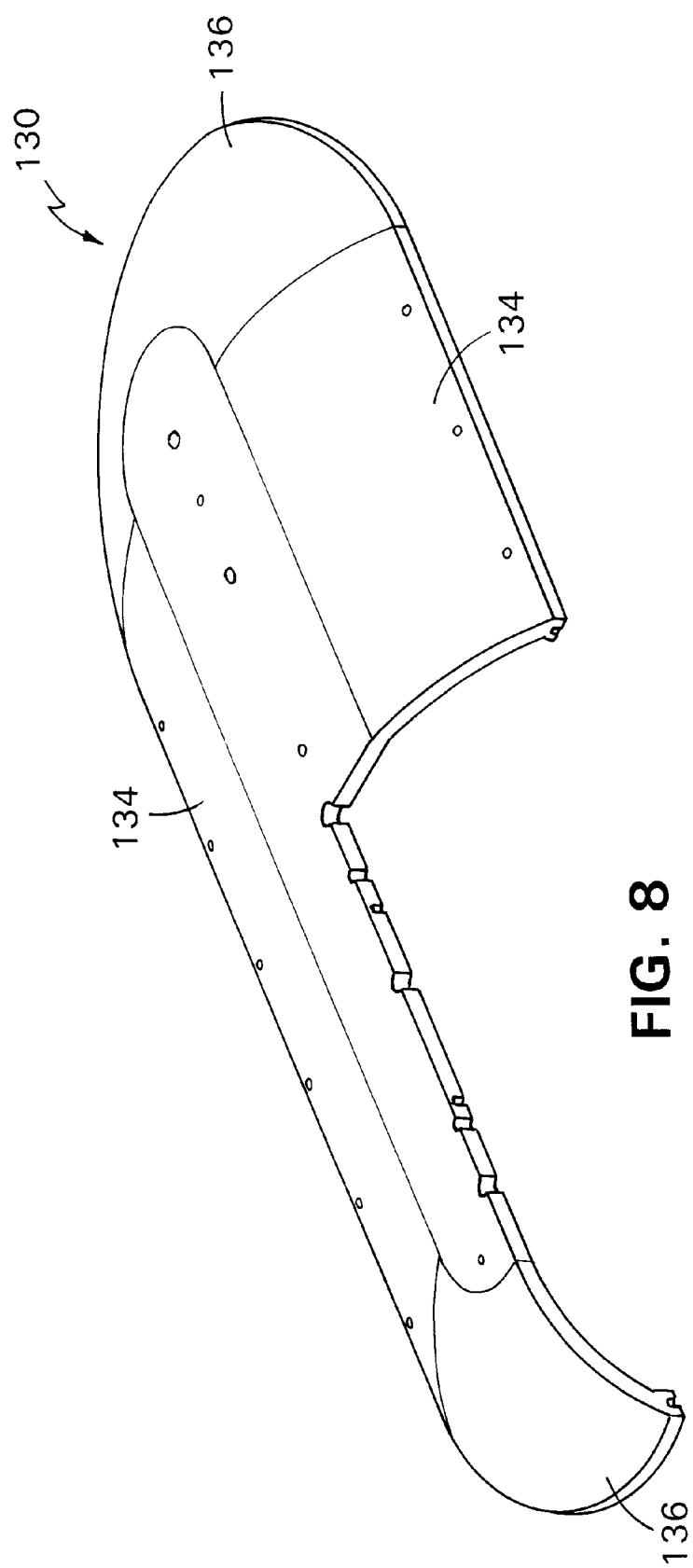
FIG. 8 is a perspective view of a mandrel suitable for winding the superconducting coil of FIG. 6.

Referring to FIG. 8, a mandrel 130 for forming superconducting coil 100 is shown. Mandrel 130 is essentially the same as mandrel 30 described above except that the surfaces of opposing tapering side sections 134 and opposing tapering end sections 136 are rounded to define the curved shape of rounded side sections 104a and end sections 104b.

Superconducting coil 10 and superconducting coil 100 are both well-suited in applications where the coils are required to be positioned within angularly-shaped regions, such as those common in rotor assemblies of electric motors.

Figure 9:
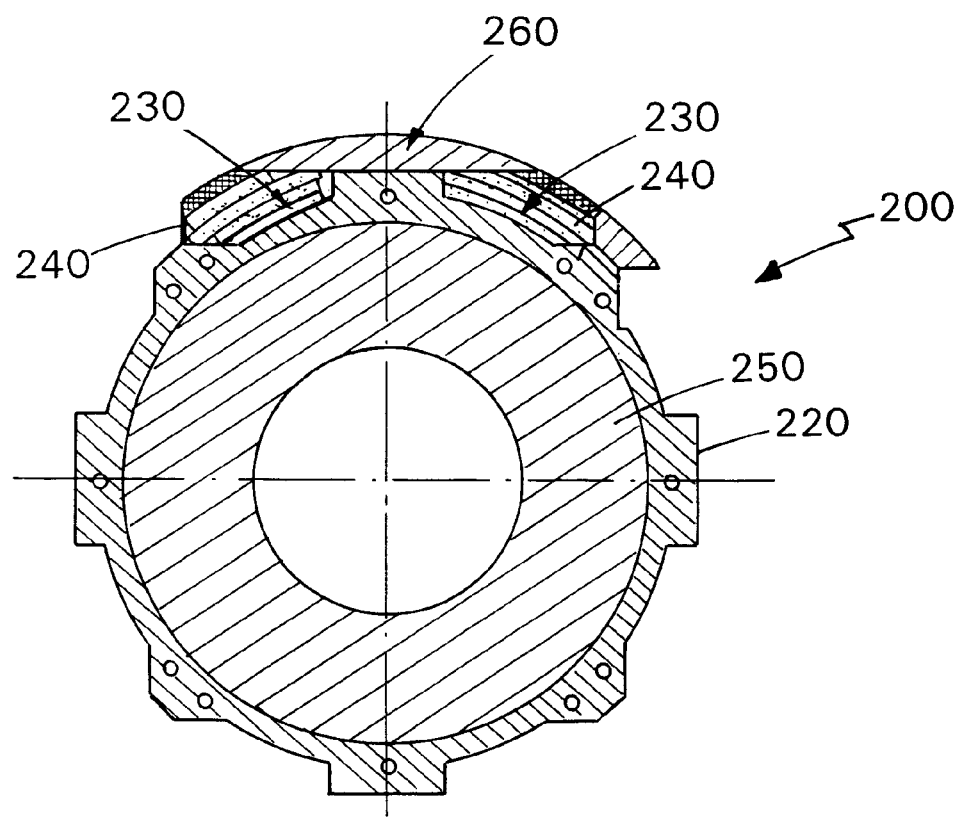
FIG. 9 is a cross-sectional end view of a portion of a rotor including the superconducting coil of FIG. 6.

With reference to FIG. 9, in one example, a rotor assembly 200 for a synchronous motor has a four-pole topology without its outer shield for enclosing the vacuum layer within the overall assembly. In this embodiment, rotor assembly 200 includes a torque tube 220 fabricated from a high-strength, ductile and non-magnetic material (e.g., stainless steel). The outer surface of the torque tube 220 supports four superconducting coil assemblies 230 (only two are shown,) each winding associated with a pole of the motor. A hollow core member 250 formed of a high permeability, high saturation flux density material (e.g., iron) is positioned within the inner volume of the torque tube to provide a low reluctance flux path for magnetic fields generated by coil assemblies 230. Coil assemblies 230 are positioned within annular regions 240 defined by the outer surface of torque tube 220 and inner surface of pole caps 260, which together with torque tube 220 define a cylinder.

Because of their shape, annular regions 240 are not well-suited for receiving superconducting coil configurations, such as stacked pancake and racetrack coils. To fill annular regions 240 with these types of superconducting coils requires that the coil assemblies be constructed with individual coils (e.g., pancakes) which are staggered in stair-step fashion. In order to fill the annular region efficiently, a relatively large number of individual coils are required to be made thin, stacked, and then connected together. Connecting the individual coils in these arrangements is non-trivial and the torque tube is generally required to be machined with a corresponding stair-step surface to support the coil assemblies, adding cost and complexity to the manufacture of the motor.

Because superconducting coil 10 and superconducting coils 100 are tapered, either linearly or in a curved manner, either coil assembly can conform within and fill annular regions 240. Unlike, the stacked pancake arrangements described above, far fewer coils are needed to fill the space, thereby reducing the number of connections and increasing the reliability and performance of the coil assemblies. Thus, a more efficient, easy to assemble motor construction is provided. Moreover, tapered coils are advantageously positioned closer to the armature of the motor.

Further, in many applications the annular regions may be formed such that the stacked tapered superconducting coils are substantially identical, which further reduces manufacturing costs. A stacked set of substantially identical tapered superconducting coils are simply connected and positioned within the annular region.

Another important advantage of the conical or tapered superconducting coil is that, in a stacked arrangement, the configuration has the benefit of shielding inner ones of the stacked coils from fields perpendicular to the broad face of the superconductor tape. Thus, a series of the tapered superconducting coils can be stacked so that the those coils having better performance characteristics are placed on the top and bottom of the stack.

Other embodiments are within the scope of the claims. For example, both single and stacked arrangements of tapered or conical superconducting coils have been described above. However, in certain applications it is desirable to wind the superconducting coil as a single pancake, rather than a number of thinner, stacked coils having the same width. The single pancake arrangement provides self-shielding and a higher critical current retention characteristic.

What is claimed is:
1. A rotor assembly comprising:
a support member; and
a superconducting coil having an axis, a first end, and a second end, the superconducting coil comprising a superconductor tape wound about the axis of the superconducting coil to provide a plurality of concentric turns disposed along the axis and defining an opening having a dimension which gradually decreases, in a direction along the axis, from the first end to the second end of the superconducting coil, each turn of the superconductor tape having a broad surface substantially parallel to the axis of the superconducting coil, and the superconducting tape is wound so that the superconducting coil conforms to a surface of the support member.

2. The rotor assembly of claim 1 wherein the superconductor tape of the superconducting coil, in conforming to the first surface of the support member, is wound in a shape defining a pair of opposing arcuate end sections connected to a pair of opposing substantially straight side sections.

3. The rotor assembly of claim 2 wherein the superconducting tape of the superconducting coil includes a multi-filament composite superconductor including individual superconducting filaments which extend a continuous length of the multi-filament composite conductor and are surrounded by a matrix-forming material.

4. The rotor assembly of claim 2 wherein the superconductor tape of the superconducting coil includes an anisotropic high temperature superconductor.

5. The rotor assembly of claim 4 wherein the anisotropic high temperature superconductor is $Bi_2Sr_2Ca_2Cu_3O$.

6. The rotor assembly of claim 4 wherein the anisotropic high temperature superconductor is a member of the rare-earth-copper-oxide family.

7. The rotor assembly of claim 4 wherein the superconductor tape of the superconducting coil includes a multi-filament composite superconductor including individual superconducting filaments which extend a continuous length of the multi-filament composite conductor and are surrounded by a matrix-forming material.

8. The rotor assembly of claim 2 wherein the superconductor tape of the superconducting coil includes a pair of superconductor layers and at least one reinforcing layer.

9. The rotor assembly of claim 8 wherein the superconductor tape of the superconducting coil includes a pair of mechanical reinforcing layers, each reinforcing layer including stainless steel.

10. The rotor assembly of claim 9 wherein the superconductor tape of the superconducting coil includes a multi-filament composite superconductor including individual superconducting filaments which extend a continuous length of the multi-filament composite conductor and are surrounded by a matrix-forming material.

11. The rotor assembly of claim 2 wherein the coil is in the form of a pancake coil.

12. The rotor assembly of claim 11 wherein the pancake coil is a double pancake coil.

13. The rotor assembly of claim 2 wherein the wound superconductor tape of the superconducting coil defines a linearly tapered inner surface of the coil extending along the axis of the coil.

14. The rotor assembly of claim 2 wherein the wound superconductor tape of the superconducting coil defines a curved inner surface of the coil extending along the axis of the coil.

15. The rotor assembly of claim 14 wherein the curved inner surface of superconducting coil is cylindrically-shaped along the opposing substantially straight side sections and have a spherically tapered shape along the opposing arcuate end sections.

16. The rotor assembly of claim 1 wherein at least part of the support member is conical in shape.

17. The rotor assembly of claim 1 wherein at least part of the support member is tapered in shape.

18. The rotor assembly of claim 1 wherein the support member comprises a torque tube having an outer surface, the outer surface supporting the superconductor coil.

19. The rotor assembly of claim 18 wherein the outer surface of the torque tube defines an annular region, and at least a portion of the superconducting coil is disposed within the annular region.

20. The rotor assembly of claim 19 wherein the superconducting coil conforms to the annular region.

* * * * *